United States Patent
Hirsch (10) Patent No.: US 12,036,743 B2
(45) Date of Patent: Jul. 16, 2024

(54) METHOD FOR MANUFACTURING AN OBJECT, IN PARTICULAR AN ORTHODONTIC APPLIANCE, BY A 3D-PRINTING DEVICE

(71) Applicant: Hirsch Dynamics Holding AG, Wollerau (CH)

(72) Inventor: Markus Hirsch, Wollerau (CH)

(73) Assignee: Hirsch Dynamics Holding AG, Wollerau (CH)

( * ) Notice: Subject to any disclaimer, the term of this patent is extended or adjusted under 35 U.S.C. 154(b) by 80 days.

(21) Appl. No.: 17/377,823

(22) Filed: Jul. 16, 2021

(65) Prior Publication Data
US 2023/0019395 A1  Jan. 19, 2023

(51) Int. Cl.
| | |
|---|---|
| *B29C 64/386* | (2017.01) |
| *A61C 13/00* | (2006.01) |
| *B22F 10/36* | (2021.01) |
| *B29C 64/129* | (2017.01) |
| *B29C 64/245* | (2017.01) |

(Continued)

(52) U.S. Cl.
CPC ........ *B29C 64/393* (2017.08); *A61C 13/0019* (2013.01); *B22F 10/36* (2021.01); *B29C 64/129* (2017.08); *B29C 64/245* (2017.08); *B29C 64/277* (2017.08); *B29C 64/386* (2017.08); *B33Y 50/00* (2014.12); *B29L 2031/753* (2013.01); *B33Y 10/00* (2014.12); *B33Y 50/02* (2014.12); *B33Y 80/00* (2014.12)

(58) Field of Classification Search
CPC ........................ A61C 13/0013; A61C 13/0019
See application file for complete search history.

(56) References Cited

U.S. PATENT DOCUMENTS

| | | | |
|---|---|---|---|
| 8,815,143 B2 * | 8/2014 | John .................. | G03F 7/0037 |
| | | | 264/401 |
| 9,764,513 B2 * | 9/2017 | Stampfl .............. | B29C 64/135 |

(Continued)

FOREIGN PATENT DOCUMENTS

| | | |
|---|---|---|
| EP | 3 219 285 A1 | 9/2017 |
| WO | 2020/206053 A1 | 10/2020 |
| WO | 2021/017937 A1 | 2/2021 |

OTHER PUBLICATIONS

International Search Report in PCT/EP2022/069726 in English, mailed Jan. 10, 2023.

*Primary Examiner* — Atul P. Khare
(74) *Attorney, Agent, or Firm* — Collard & Roe, P.C.

(57) ABSTRACT

A method for manufacturing an object, in particular an orthodontic appliance, by a 3D-printing device comprising a supply device for provision of a non-solidified material and means for illumination to solidify a layer of non-solidified material provided by the supply device at least zonally to fabricate the object, characterized by the following steps:
  a virtual model of the object to be printed is provided for the 3D-printing device,
  the supply device provides a layer of the non-solidified material,
  the means for illumination solidify the layer at least zonally, whereby the means for illumination comprises illumination pixels arranged in a grid, preferably with a dimension (between 10 μm and 80 μm, particularly preferred between 30 μm and 50 μm, wherein at least one dimension of the object represented by the virtual model is chosen to be aligned with the dimension of the illumination pixels.

17 Claims, 2 Drawing Sheets

(51) Int. Cl.
    *B29C 64/277*     (2017.01)
    *B29C 64/393*     (2017.01)
    *B33Y 50/00*     (2015.01)
    *A61C 7/12*     (2006.01)
    *B29L 31/00*     (2006.01)
    *B33Y 10/00*     (2015.01)
    *B33Y 50/02*     (2015.01)
    *B33Y 80/00*     (2015.01)

(56) References Cited

U.S. PATENT DOCUMENTS

| | | | |
|---|---|---|---|
| 10,828,133 B2 * | 11/2020 | Tong | B29C 64/386 |
| 11,471,251 B2 * | 10/2022 | Hirsch | G16H 50/20 |
| 11,612,459 B2 * | 3/2023 | Tong | B33Y 50/02 |
| | | | 264/16 |
| 2008/0171284 A1 | 7/2008 | Hull et al. | |
| 2021/0307877 A1 * | 10/2021 | Hirsch | B22F 3/225 |
| 2022/0281162 A1 | 9/2022 | Liu | |
| 2022/0417741 A1 * | 12/2022 | Hirsch | A61C 13/00 |

* cited by examiner

METHOD FOR MANUFACTURING AN OBJECT, IN PARTICULAR AN ORTHODONTIC APPLIANCE, BY A 3D-PRINTING DEVICE

BACKGROUND OF THE INVENTION

1. Field of the Invention

The present invention relates to a method for manufacturing an object, in particular an orthodontic appliance, by a 3D-printing device comprising a supply device for provision of a non-solidified material and means for illumination to solidify a layer of non-solidified material provided by the supply device at least zonally to fabricate the object, whereby if applicable, an intensity and/or a duration of the means for illumination is adjustable. Furthermore, the present invention relates to an arrangement of a processing unit, in particular of a computer, and a 3D-printing device for manufacturing objects, in particular orthodontic appliances, comprising a supply device for provision of a non-solidified material and means for illumination to solidify a layer of non-solidified material provided by the supply device to fabricate the object suitable to perform such a method. Further, the present invention relates to a computer program, a computer-readable medium as well as a use of such a method and a use of such an arrangement.

2. The Prior Art

Such a method is shown in prior art document EP 3 219 285 A1, whereby a limited precision in the 3D printing process—in particular with respect to an arch wire slot of an orthodontic bracket—is compensated by a specific constructional design of the orthodontic bracket to be printed by a 3D printing device.

A disadvantage of the prior art is that a reconstruction of a given design of an orthodontic bracket is cumbersome and can annihilate positive impacts during treatment with the orthodontic bracket with a specific design. It is desirable to improve the 3D printing process as such to enable a precision of the 3D printing process so that it is applicable to conventional orthodontic brackets or other objects to be printed by a 3D printing device without the requirement of reconstructions, in particular without the necessity of long 3D printing durations and costly 3D printing devices.

SUMMARY OF THE INVENTION

It is an object of the present invention to provide a method for manufacturing an object, in particular an orthodontic appliance, as well as an arrangement suitable to perform such a method that are appropriate to eliminate at least some of the disadvantages of the prior art, whereby in particular a precision of dimension of the object to be printed can be increased.

Usually, an orientation of the object to be printed in the 3D printing device with respect to a virtual model of the object is determined based on the design of the object to be printed so that an overhang during the 3D printing process is avoided which can ruin the structure of the object to be printed by gravitational force acting on the layers which have not been yet solidified.

Usually, an intensity and a duration of the illumination with respect to the object to be printed in the 3D printing device is dependent on material specific characteristics like composition and/or absorption capacity. Commonly, scattered light is suppressed in a way that solely regions of interest are solidified by the light, viz. the region defined by an illumination pixel. Illumination is also known to be used in the context of identifying imperfections in the layers of the object during the printing process.

The object of the present invention is accomplished by a method having the features of claim 1.

It is therefore provided that a virtual model of the object to be printed is provided for the 3D-printing device, the supply device provides a layer of the non-solidified material, the means for illumination solidify the layer at least zonally, whereby the means for illumination comprises illumination pixels with a dimension between 10 µm and 80 µm, particularly preferred between 30 µm and 50 µm, wherein at least one dimension of the object represented by the virtual model is chosen to be aligned with the dimension of the illumination pixels.

The alignment of the at least one dimension with the illumination pixels enables that precisely that part of the object to be printed is solidified which corresponds to the at least one dimension of the of object, whereby it is prevented that there is an overlap between illumination pixels which cause the non-solidified material to solidify with non-solidified material of the at least one dimension that shall not be solidified or rather only that area of the layers are solidified which has to be solidified with respect to the at least one dimension.

Alignment means that the object or a feature of the object is adjusted, in particular adjacent arranged, to the illumination pixels of the means for illumination (or rather with digital pixels), whereby the term dimension can be understood as a measurement of the object to be printed—for example a gap between faces of the object to be printed (length extension) and/or an orientation of faces to one another (in two or three dimensions) with respect to the object to be printed.

Solidified means in this context that material is not removed in a step of removing/cleaning as the material is cured by the impact of the means for illumination. Non-solidified however means that the material is removed during removing/cleaning and the material is absent in the printed object.

The means for illumination can be a light source such as natural light or light having a specific frequency spectrum such as at least one UV-light source or at least one laser source. For the case of a laser source as means for illumination, it is particularly preferred that the laser sequentially illuminates the illumination pixels to solidify the layer iteratively by illuminating a certain illumination pixel or certain illumination pixels per time interval, whereby the time interval is particularly preferred short to print the object fast. For the case of a UV-light source or a natural light source, it is particularly preferred that a grid of illumination pixels per layer of non-solidified material is illuminated as a whole.

The present invention can be used with any non-solidified material to be solidified by use of the means for illumination, whereby the non-solidified material is preferably in the form of a, particularly preferred liquid, suspension or a slurry or a light-hardening plastic of a powder or a combination of at least one of these forms. It is particularly preferred that the material of the non-solidified material is a liquid suspension comprising ceramic powder and/or UV-light sensitive monomers. It is conceivable as well to use a material like metal, plastic and/or ceramic in other forms as the non-solidified material (for example a plastic powder, a plastic slurry, a metal powder, a ceramic powder et cetera) to build the object comprising at least one of the materials: ceramic, plastic and metal. Additives can be used as well but are in general not necessary.

For example, 3D-printing devices can make use of the LCM (lithography-based ceramic manufacturing) process in connection with ceramics, which is a multi-part additive manufacturing process for building 3D object from technical ceramics. A liquid suspension of fine-grain ceramic powder and a UV-light-sensitive monomers (for example in the form of resin) is built up layer by layer in this stereolithography process. Preferably, a green body is built, which can be cured by irradiation with a DLP projector, whereby the green body undergoes a multi-stage thermal treatment—particularly preferred at firing temperatures of, for example, up to 1600° C.— and/or a thermal debinding and/or a final sintering process. Advantages are inter alia high-precision components with an extremely smooth surface, a resistance with respect to acid, heat as well as alkali, high modulus of elasticity at high temperatures, good electrical insulation properties, gas-tight material, diverse areas of application due to biocompatibility, tool-free production, serial production possibility, great freedom of design in the construction et cetera.

If the 3D-printing device is in the form of an LCM device, it is particularly preferred that the 3D-printing device uses the process of reversed lithography-based ceramic manufacturing, whereby the object to be printed dips along the direction of the gravitation force into the non-solidified material or rather contacts the non-solidified material to add further layers by use of the means for illumination during dipping. The means for illumination are in this case arranged underneath the non-solidified material and transmit light through the non-solidified material. Apparently, any 3D-printing device can be used according to the present invention—in particular conventional LCM devices, whereby the means for illumination are arranged above the non-solidified material and the object is built up in layers in opposite direction with respect to the direction of the gravitational force.

Other 3D-printing processes used by the 3D-printing device can be for example Selective laser melting (SLM) or Selective laser sintering (SLS) or as the case may be. In this case, the means for illumination is in the form of a laser, whereby it is particularly preferred that the laser can sequentially illuminate the illumination pixels to solidify the non-solidified material to build up layers of the object.

In general, other 3D-printing processes like slurry-based additive manufacturing including selective laser burn-out (SLB) are applicable as well.

Various materials can be used for the object to be printed. For example metals can be used in 3D-printing devices using SLM and SLS, plastics can be used in 3D-printing devices using slurry-based additive manufacturing processes, ceramics can be used in 3D-printing devices using LCM, whereby ceramics is applicable in slurry-based additive manufacturing processes as well for instance.

The illumination pixels are in general arranged on the layer which have to be solidified at least zonally to build the object to be printed. They can be in general visualized on a visualization device and represented by a grid on the layer of non-solidified material of a solution to be solidified.

The virtual model can be example provided by a computer with x-rays, scan-files, CAD-files, STL-files, OBJ-files, photographs or as the case may be as digital input, whereby the virtual model can be in the form of CAD-files, STL-files and/or OBJ-files for instance. The dimension of the printed object or rather the object to be printed is, if applicable by considering a shrinkage, already present or rather represented in the virtual model.

It is particularly preferred that a plurality of objects, in particular orthodontic appliances as orthodontic brackets and/or orthodontic aligners, are 3D-printed simultaneously.

Moreover, the object of the present invention is accomplished by a method having the features of claim 7.

It is therefore provided that
a virtual model of the object to be printed is provided for the 3D-printing device, whereby the virtual model comprises digital pixels, preferred with a dimension between 10 μm and 80 μm, particularly preferred between 30 μm and 50 μm, wherein at least one dimension of the object is chosen to be aligned with the dimension of the digital pixels,
the supply device provides a layer of the non-solidified material,
the means for illumination solidify the layer at least zonally.

The alignment of the at least one digital pixels with the at least one dimension of the object to be printed enables that there is a clear differentiation between digital pixels in connection with the at least one dimension that have to be solidified by the means for illumination and those digital pixels that mustn't be solidified by the means for illumination. The differentiation can be effected by means of a threshold value, which is particularly preferred 50% overlap but can be in general arbitrary.

For example, the at least one dimension can be identified with a width of the object in the virtual model that corresponds to an area (width of the object extended over a certain degree of the object) of the object to be printed that shall not be solidified. If the digital pixels would not be aligned with the at least one dimension—which is in general the case—the means for illumination interprets digital pixels which have an overlap with the at least one dimension of above 50% or a predefined trigger value to be illuminated and digital pixels which have an overlap with the at least one dimension underneath 50% or a predefined trigger value not to be illuminated and thus these pixels will not be illuminated. As a consequence, there is an ambiguousness possible regarding the at least one dimension and the digital pixels that represent the at least one dimension, whereby this ambiguousness is excluded by this specific alignment. In general, the at least one dimension can be defined as an area of the object to be printed—represented by the virtual model for instance—and can be one-, two- or three-dimensional.

The at least one dimension can be an inner dimension and/or an external dimension of the object to be printed, whereby a higher amount of solidified material of the object to be printed corresponds to a reduction of the inner dimension or rather an expansion of the external dimension. Hence, it is possible to fabricate a printed object having more precise feature and, possibly, smoother surfaces without postprocessing.

Moreover, the object of the present invention is accomplished by a method having the features of claim 13.

It is therefore provided that
a virtual model of the object to be printed is provided for the 3D-printing device,
the supply device provides a layer of the non-solidified material,
the means for illumination solidify the layer at least zonally, whereby the intensity and/or the duration of the means for illumination is adjusted with respect to a chosen precision of at least one dimension of the object, in particular with respect to an expansion and/or a reduction of a region in which material is solidified to meet the chosen precision of the at least one dimension of the object.

An adjustment of the intensity and/or the duration of the means for illumination—that means a time for which areas of the layers are illuminated by the means for illumination and/or an amount of light which hit areas of the layers by the means for illumination—is thus used in a novel way. The intensity and/or duration is not solely used for a specific material of the object to be printed, but to adjust an amount of material that is solidified.

The intensity and duration of the means for illumination are two possibilities to adjust the amount of material that is solidified. If more light hits the non-solidified layer in a certain illumination pixel—the light spreads around the illumination pixel and solidifies also material around the illumination pixel. If less light hits the illumination pixel, the solidification of the illumination pixel can be reduced in particular at the border of the illumination pixel. Same applies with respect to the duration of the illumination. One can adjust the duration in such a way, that the solidification of the illumination pixel approximates the at least one dimension to a chosen precision. Hence, also a reduction for illumination time and/or illumination intensity can cause the desired effect to enhance the precision of the at least one dimension.

The at least one dimension of the object to be printed can be precisely realized by expansion and/or reduction of the region in which material is solidified, whereby it is particularly preferred that the expansion and/or reduction is generated by means of scattered light. Usually, a boundary condition for a resolution of dimensions of the object to be printed with respect to the solidification of material is the dimension of illumination pixels, whereby this boundary condition can be overcome by expanding and/or reducing the region which is solidified with respect to specific illumination pixels by means of intensity, duration and/or distinct intensity levels of illumination for instance.

The duration and/or intensity can be adapted simultaneously, whereby a boundary condition can be for example a maximum time to fabricate the object to be printed, whereby a longer exposure of certain illumination pixels—viz. the duration of the means for illumination—can be reduced for dimensions that are of not particular interest and raised in connection with the at least one dimension.

The expansion and/or reduction of the region in which material is solidified is in general particularly preferred caused by scattered light inside the object to be printed and/or at an outer surface of the object to be printed. For example, by means of intensity levels, an amount of scattered light can be adjusted, whereby higher intensities result in a higher amount of scattered light and hence to an expanded region in which material is solidified compared to regions of lower intensities used by the means for illumination Scattered light, in particular inside the object to be printed and/or at an outer surface of the object to be printed, is in general undesired as it modifies the amount of solidified material of the object to be printed, viz. an expansion of the region in which material is solidified is affected by the scattered light. On the other hand, scattered light can be individually utilized for a solidification of specific regions in a defined/desired way—for example, by use of different intensity levels to adjust the solidification (expand or reduce the region in which material is solidified) to the at least one dimension, particularly in three dimensions.

The alignment of the digital pixel, the alignment of the illumination pixels as well as the adjustment of the intensity and/or duration with respect of the illumination by the means for illumination can be used individual or combined to print the object with the at least one dimension with a desired or rather chosen precision.

As stated above, protection is also sought after an arrangement of a processing unit, in particular of a computer, and a 3D-printing device for manufacturing objects, in particular orthodontic appliances, comprising a print head for applying a non-solidified material in layers and means for illumination to solidify a layer of non-solidified material applied by the print head to fabricate the object suitable to perform such a method, characterized in that the 3D-printing device is in signal conducting connection with the processing unit or can be brought into such a signal conducting connection, characterized in that a digital data record comprising instructions for the 3D-printing device to fabricate the object according to such a method by the digital data record is transmittable by the processing unit to the 3D-printing device.

As stated above, protection is also sought after a computer program which, when the program is executed by a processing unit, cause the processing unit to carry out such a method.

As stated above, protection is also sought after a computer-readable medium, i.e., a non-transitory computer-readable medium, comprising instructions which, when executed by a processing unit, cause such an arrangement to carry out such a method.

As stated above, protection is also sought after a use of such a method for manufacturing an orthodontic appliance, whereby the orthodontic appliance is particularly preferred an orthodontic bracket or an orthodontic aligner.

As stated above, protection is also sought after a use of such an arrangement for manufacturing an orthodontic appliance, whereby the orthodontic appliance is particularly preferred an orthodontic bracket or an orthodontic aligner.

Preferred embodiments of the present invention are defined in the dependent claims. Features of the method claims are applicable with respect to the product claims and vice versa. Features of a specific method claim are applicable with respect to other method claims as well.

With respect to the alignment of the digital pixel, the alignment of the illumination pixels and/or the adjustment of the intensity and/or duration with respect of the illumination by the means for illumination it is particularly preferred provided that illumination pixels of the means for illumination arranged at the layer to be at least zonally solidified can be illuminated by the means for illumination with, preferably 256 equidistant, different intensity levels, whereby the intensity level of a specific illumination pixel is adjustable.

By use of different intensity levels it is possible to generate a two-dimensional illumination grid—with respect to the layer which is at least partially solidified—in connection with an individually adaptable expansion and/or reduction of the region in which material is solidified, whereby an expansion and/or reduction of the region in which material is solidified orthogonal to the two-dimensional illumination grid can be adjusted as well. Hence, the object to be printed can be manipulated in three dimensions by use of different intensity levels, for example to reduce a surface roughness, particularly favorably approximate surfaces and/or build precise curved geometries like openings which are orientated orthogonal to a printing direction. Interdependencies within a specific layer and/or adjacent layers can be used for accurately map complex geometries by the 3D-printing device.

In a preferred embodiment of the present invention, it is provided that the object is in the form of an orthodontic appliance, preferably the orthodontic appliance comprising an arch wire slot with a width of the arch wire slot and the at least one dimension of the object is the width of the arch wire slot, at least one face of the arch wire slot and/or essentially a complete surface of the arch wire slot.

Not all dimensions of objects are of particular interest with respect to a high accuracy. In the case of orthodontic appliances, a width of the arch wire slot (and if applicable, a parallelism of faces of the arch wire slot) has to be precise to a high extend, so that a desired treatment by the orthodontic appliance—as for example via an orthodontic bracket—can be ensured. The at least one dimension can be defined merely as a width of the arch wire slot or as an area of the arch wire slot comprising the width and a depth of the arch wire slot. If the surface of the arch wire slot is identified as the dimension or rather feature of interest of the object, the dimension corresponds to a three-dimensional surface. A contour as the dimension of the object is applicable as well.

If the at least one dimension is defined as the width of the arch wire slot, one can adjust the manufacturing process in such a way, that the orthodontic appliance—or in general the object to be printed—is fabricated by the 3D-printing device efficiently with respect to a production time and as a consequence with low manufacturing costs and simultaneous use resources specific for the at least one dimension of the orthodontic appliance. This compromise can be adjusted with respect to the requirement of the object to be printed.

In a preferred embodiment of the present invention, it is provided that the 3D-printing device comprises a print platform, whereby the means for illumination is positioned relative to the print platform in an illumination direction, in particular in a direction orthogonal to the print platform, whereby the virtual model is chosen to be arranged along the print platform, in particular such that scattered light of the means for illumination reflected by the object is reduced with respect to the at least one dimension of the object.

For example, the means for illumination can be aligned that the illumination is generated in direction orthogonal to the print platform and the at least one dimension is aligned in a plane parallel to the print platform. In the case of a width of the arch wire slot, at least one face of the arch wire slot and/or the surface of the arch wire slot as the at least one dimension, the arch wire slot can be fabricated step-by-step in a way that the arch wire slot is built up in a direction orthogonal to the print platform as well.

Particularly preferred, the object is moved relative to the print platform, in particular repetitive for each layer to be zonally solidified, by means of a movement device.

In a preferred embodiment of the present invention, it is provided that by a computer, particularly preferred a processing unit of the computer, automatically
the virtual model is created and/or
the at least one dimension of the object is identified and/or
digital pixels of the virtual model, preferred with a dimension between 10 µm and 80 µm are aligned with the at least one dimension of the object and/or
illumination pixels of the means for illumination arranged at the layer to be at least zonally solidified with a dimension between 10 µm and 80 µm are aligned with the at least one dimension of the object and/or
a digital data record is created, whereby the digital data record comprises intensity instructions and/or duration instructions for the means for illumination.

For example, an algorithm can calculate the information of interest by providing the algorithm with the required data—e.g., CAD-files, information about the object (like at least one chosen dimension), a desired granularity of digital pixels and illumination pixels, fabrication time et cetera. The alignment is referred to the dimension of the corresponding digital pixel and/or illumination pixel, in particular to be adjacent to at least one feature of the object to be printed.

In a preferred embodiment of the present invention, it is provided that a shrinkage of the object during illumination and/or post-processing is considered in the provision of the virtual model.

It is particularly preferred that a computer automatically considers the predicted shrinkage—on basis of the dimension of parts with respect to the object to be printed by an algorithm that integrates material specific characteristics in its calculation for instance. It is conceivable to use a data base that includes experimental data in this context.

Examples for post-processing steps are temperature treatments, sintering, grinding, cooling et cetera and can be considered during the 3D-printing process.

In the procedure of solidifying the layers during the 3D-printing process the dimensions of the solidified layers are smaller than the dimensions of the non-solidified layers, which can be taken into account already in the virtual model that represents the object to be printed. The alignment of illumination pixels and/or digital pixels as well as the adjustment of the intensity and/or duration of the means for illumination can further improve the precision of at least one dimension that is realized in the printed object by the incorporating the shrinkage—in particular the shrinkage with respect to the at least one dimension—already in the virtual model.

In a preferred embodiment of the present invention, whereby an intensity and/or a duration of the means for illumination is adjustable, it is provided that the chosen precision is between 10 µm and 35 µm, particularly preferred between 15 µm and 25 µm.

It is possible to increase the precision of the at least one dimension beyond the limitation that is given by the digital pixels and the illumination pixels. The chosen precision can be selected in dependence with manufacturing time, manufacturing costs, requirements regarding the object to be printed et cetera.

A realization of the chosen precision can be implemented by using the intensity and/or duration of the means for illumination. For example, if the illumination pixels are aligned with a width of the arch wire slot (as the at least one dimension between two faces of the arch wire slot) at one end of the extension of the arch wire slot precisely and overlap the arch wire slot merely to 10% at the other end, 10% of the arch wire slot would not be illuminated (as an overlap is underneath 50%). But the illumination of the illumination pixel next to the illumination pixel with an overlap of 10% can be illuminated less to reduce the extension of solidified material. For the case of illumination pixel overlaps of 90% one can for example increase the illumination for this illumination pixel similarly. Thus, a precise adjustment of the extension of the at least one dimension can be ensured by varying the intensity and/or duration by the means for illumination. It is possible to proceed analogously with respect to digital pixels.

In a preferred embodiment of the present invention, whereby an intensity and/or a duration of the means for illumination is adjustable, it is provided that the intensity and/or duration varies for
- different digital pixels and/or
- different illumination pixels and/or
- different dimensions of the object and/or
- at least one chosen dimension of the object and at least one non-chosen dimension of the object.

The illumination pixels can be individually adjusted with respect to intensity and/or duration according to a grid of illumination pixels that is simultaneously illuminated by the means for illumination. As alternative or in addition it can be possible—for example in the case of a laser as means for illumination as alternative to a visible light source or a UV-light source—that the intensity and/or duration of specific illumination pixels of one layer to be solidified are adapted with respect to intensity and/or duration during a sequential illumination of individual illumination pixels.

It is in general not desired to adjust the intensity and/or duration for all illumination pixels as this could result in a high manufacturing time, whereby the intensity and/or the duration for those illumination pixels can be adjusted which are connected with the at least one dimension to improve the precision for selected areas of the objected to be printed— viz. for the at least one dimension.

In a preferred embodiment of the present invention, it is provided that the second step and the third step are repeatedly processed by the 3D-printing device to iteratively fabricate the object.

It is in general possible that the at least one dimension varies along a printing direction of object to be printed or a plurality of dimension in a specific layer or with respect to distinct layers are considered by the at least one dimension that is chosen to be fabricated with higher accuracy.

Particularly preferred is the object in the form of an orthodontic appliance. In a particularly preferred embodiment of the present invention the orthodontic appliance comprises an arch wire slot with a width of the arch wire slot and the at least one dimension of the object is the width of the arch wire slot, at least one face of the arch wire slot and/or essentially a complete surface of the arch wire slot.

The at least one dimension is in general not limited to the width of the arch wire slot. The orthodontic bracket can for example comprise instead or in addition a hook for attaching a general bracket body to an individualized bonding means to build a personalized orthodontic bracket, whereby a dimension of the hook constitutes the at least one dimension. Thus, the accuracy on specific parts of the orthodontic bracket can be enhanced, while the remaining parts of the orthodontic without the need of high accuracy can be fabricated faster.

In a preferred embodiment of the present invention, it is provided that the 3D-printing device comprises a print platform, whereby the means for illumination is positioned relative to the print platform in an illumination direction, in particular in a direction orthogonal to the print platform, whereby the virtual model is chosen to be arranged along the print platform such that scattered light of the means for illumination reflected by the object and/or transmitted in regions of the layer not to be solidified is reduced with respect to the at least one dimension of the object.

As the exposure of non-solidified material results in a solidification, by aligning the at least one dimension towards the means for illumination such that scattered light is minimized, the risk of undesired solidification or blurred areas along the at least one dimension can be reduced.

In a preferred embodiment of the present invention, whereby an intensity and/or a duration of the means for illumination is adjustable, it is provided that the intensity and/or duration is chosen by the computer automatically under consideration of a chosen precision of the at least one dimension of the object.

By the automatic consideration of the chosen precision the supply chain can be simplified. For example, one can choose a precision of the width of the arch wire slot of an orthodontic bracket and if applicable a precision of the remaining parts (if no default value is chosen). It is conceivable to input more information like desired manufacturing time to print the object. The computer can use the input date and calculate appropriate instructions for the means for illumination such that the chosen precision of the at least one dimension can be achieved ideally under consideration of certain constraints (e.g., extension of illumination pixels).

In a preferred embodiment of the present invention, it is provided that the 3D-printing device is in the form of a slurry-based additive manufacturing apparatus and/or a lithography-based ceramic manufacturing apparatus and/or the material used by the 3D-printing device to fabricate the object is in the form of ceramic or plastic or metal.

In general, it is possible to use any suitable material and any appropriate 3D-printing process as the method for manufacturing the object is applicable to a variety of different kinds of objects and 3D-printing devices.

Embodiment 1

A method for manufacturing an object, in particular an orthodontic appliance, by a 3D-printing device comprising a supply device for provision of a non-solidified material and means for illumination to solidify a layer of non-solidified material provided by the supply device at least zonally to fabricate the object, characterized by the following steps:
- a virtual model of the object to be printed is provided for the 3D-printing device,
- the supply device provides a layer of the non-solidified material,
- the means for illumination solidify the layer at least zonally, whereby the means for illumination comprises illumination pixels arranged in a grid, preferably with a dimension between 10 μm and 80 μm, particularly preferred between 30 μm and 50 μm, wherein at least one dimension of the object represented by the virtual model is chosen to be aligned with the dimension of the illumination pixels.

Embodiment 2

The method according to embodiment 1, whereby the illumination pixels can be illuminated by the means for illumination with, particularly preferred 256 equidistant, different intensity levels, whereby the intensity level of a specific illumination pixel is adjustable.

Embodiment 3

The method according to embodiment 1 or 2, whereby the object is in the form of an orthodontic appliance, preferably the orthodontic appliance comprising an arch wire slot with a width of the arch wire slot and the at least one dimension of the object is the width of the arch wire slot, at least one face of the arch wire slot and/or essentially a complete surface of the arch wire slot.

Embodiment 4

The method according to one of the embodiments 1 to 3, whereby the 3D-printing device comprises a print platform, whereby the means for illumination is positioned relative to the print platform in an illumination direction, in particular in a direction orthogonal to the print platform, whereby the virtual model is chosen to be arranged along the print platform, in particular such that scattered light of the means for illumination reflected by the object is reduced with respect to the at least one dimension of the object.

Embodiment 5

The method according to one of the embodiments 1 to 4, whereby by a computer, particularly preferred a processing unit of the computer, automatically
the virtual model is created and/or
the at least one dimension of the object is identified and/or
digital pixels of the virtual model, preferred with a dimension between 10 µm and 80 µm are aligned with the at least one dimension of the object and/or
the illumination pixels are aligned with the at least one dimension of the object and/or
a digital data record is created, whereby the digital data record comprises intensity instructions and/or duration instructions for the means for illumination.

Embodiment 6

The method according to one of the embodiments 1 to 5, whereby a shrinkage of the object during illumination and/or post-processing is considered in the provision of the virtual model.

Embodiment 7

A method for manufacturing an object, in particular an orthodontic appliance, by a 3D-printing device comprising a supply device for provision of a non-solidified material and means for illumination to solidify a layer of non-solidified material provided by the supply device at least zonally to fabricate the object, particularly preferred the method according to one of the embodiments 1 to 6, whereby
a virtual model of the object to be printed is provided for the 3D-printing device, whereby the virtual model comprises digital pixels, preferred with a dimension between 10 µm and 80 µm, particularly preferred between 30 µm and 50 µm, wherein at least one dimension of the object is chosen to be aligned with the dimension of the digital pixels,
the supply device provides a layer of the non-solidified material,
the means for illumination solidify the layer at least zonally.

Embodiment 8

The method according to the embodiments 7, whereby the object is in the form of an orthodontic appliance, preferably the orthodontic appliance comprising an arch wire slot with a width of the arch wire slot and the at least one dimension of the object is the width of the arch wire slot, at least one face of the arch wire slot and/or essentially a complete surface of the arch wire slot.

Embodiment 9

The method according to embodiment 7 or 8, whereby the 3D-printing device comprises a print platform, whereby the means for illumination is positioned relative to the print platform in an illumination direction, in particular in a direction orthogonal to the print platform, whereby the virtual model is chosen to be arranged along the print platform, in particular such that scattered light of the means for illumination reflected by the object is reduced with respect to the at least one dimension of the object.

Embodiment 10

The method according to one of the embodiments 7 to 9, whereby by a computer, particularly preferred a processing unit of the computer, automatically
the virtual model is created and/or
the at least one dimension of the object is identified and/or
the digital pixels are aligned with the at least one dimension of the object and/or
illumination pixels of the means for illumination arranged at the layer to be at least zonally solidified comprise a dimension between 10 µm and 80 µm which are aligned with the at least one dimension of the object and/or
a digital data record is created, whereby the digital data record comprises intensity instructions and/or duration instructions for the means for illumination.

Embodiment 11

The method according to one of the embodiments 7 to 10, whereby a shrinkage of the object during illumination and/or post-processing is considered in the provision of the virtual model.

Embodiment 12

The method according to one of the embodiments 7 to 11, whereby illumination pixels of the means for illumination arranged at the layer to be at least zonally solidified can be illuminated by the means for illumination with, particularly preferred 256 equidistant, different intensity levels, whereby the intensity level of a specific illumination pixel is adjustable.

Embodiment 13

A method for manufacturing an object, in particular an orthodontic appliance, by a 3D-printing device comprising a supply device for provision of a non-solidified material and means for illumination to solidify a layer of non-solidified material provided by the supply device at least zonally to fabricate the object, particularly preferred the method according to one of the embodiments 1 to 12, whereby an intensity and/or a duration of the means for illumination is adjustable, whereby
a virtual model of the object to be printed is provided for the 3D-printing device,
the supply device provides a layer of the non-solidified material,
the means for illumination solidify the layer at least zonally, whereby the intensity and/or the duration of the means for illumination is adjusted with respect to a chosen precision of at least one dimension of the object, in particular with respect to an expansion and/or a reduction of a region in which material is solidified to meet the chosen precision of the at least one dimension of the object.

Embodiment 14

The method according to embodiment 13, whereby the chosen precision is between 10 µm and 35 µm, particularly preferred between 15 µm and 25 µm.

Embodiment 15

The method according to embodiment 13 or 14, whereby the intensity and/or duration varies for
- different digital pixels and/or
- different illumination pixels of the means for illumination arranged at the layer to be at least zonally solidified and/or
- different dimensions of the object and/or
- at least one chosen dimension of the object and at least one non-chosen dimension of the object.

Embodiment 16

The method according to one of the embodiments 13 to 15, whereby illumination pixels of the means for illumination arranged at the layer to be at least zonally solidified can be illuminated by the means for illumination with, particularly preferred 256 equidistant, different intensity levels, whereby the intensity level of a specific illumination pixel is adjustable.

Embodiment 17

The method according to one of the embodiments 13 to 16, whereby the provision of the layer of non-solidified material and the at least zonally solidification of the layer are repeatedly processed by the 3D-printing device to iteratively fabricate the object.

Embodiment 18

The method according to one of the embodiments 13 to 17, whereby the object is in the form of an orthodontic appliance.

Embodiment 19

The method according to one of the embodiments 13 to 18, whereby the orthodontic appliance comprising an arch wire slot with a width of the arch wire slot and the at least one dimension of the object is the width of the arch wire slot, at least one face of the arch wire slot and/or essentially a complete surface of the arch wire slot.

Embodiment 20

The method according to one of the embodiments 13 to 19, whereby the 3D-printing device comprises a print platform, whereby the means for illumination is positioned relative to the print platform in an illumination direction, in particular in a direction orthogonal to the print platform, whereby the virtual model is chosen to be arranged along the print platform, in particular such that scattered light of the means for illumination reflected by the object and/or transmitted in regions of the layer not to be solidified is reduced with respect to the at least one dimension of the object.

Embodiment 21

The method according to one of the embodiments 13 to 20, whereby by a computer, particularly preferred a processing unit of the computer, automatically
- the virtual model is created and/or
- the at least one dimension of the object is identified and/or
- digital pixels of the virtual model, preferred with a dimension between 10 µm and 80 µm are aligned with the at least one dimension of the object and/or
- illumination pixels of the means for illumination arranged at the layer to be at least zonally solidified comprise a dimension between 10 µm and 80 µm are aligned with the at least one dimension of the object and/or
- a digital data record is created, whereby the digital data record comprises intensity instructions and/or duration instructions for the means for illumination.

Embodiment 22

The method according to one of the embodiments 13 to 21, whereby the intensity and/or duration is chosen by the computer automatically under consideration of a chosen precision of the at least one dimension of the object.

Embodiment 23

The method according to one of the embodiments 13 to 22, whereby the 3D-printing device is in the form of a slurry-based additive manufacturing apparatus and/or a lithography-based ceramic manufacturing apparatus and/or the material used by the 3D-printing device to fabricate the object is in the form of ceramic or plastic or metal.

Embodiment 24

The method according to one of the embodiments 13 to 23, whereby a shrinkage of the object during illumination and/or post-processing is considered in the provision of the virtual model.

Embodiment 25

An arrangement of a processing unit, in particular of a computer, and a 3D-printing device for manufacturing objects, in particular orthodontic appliances, comprising a supply device for providing a non-solidified material and means for illumination to solidify a layer of non-solidified material provided by the supply device at least zonally to fabricate the object suitable to perform the method of at least one of the embodiments 1 to 24, characterized in that the 3D-printing device is in signal conducting connection with the processing unit or can be brought into such a signal conducting connection, characterized in that a digital data record comprising instructions for the 3D-printing device to fabricate the object according to at least one of the embodiments 1 to 24 by the digital data record is transmittable by the processing unit to the 3D-printing device.

Embodiment 26

A computer program which, when the program is executed by a processing unit, causes the processing unit to carry out the method of at least one of the embodiments 1 to 24.

Embodiment 27

A computer-readable medium comprising instructions which, when executed by a processing unit, cause the arrangement of embodiment 24 to carry out the method of at least one of the embodiments 1 to 24.

Embodiment 28

Use of the method according to at least one of the embodiments 1 to 24 for manufacturing an orthodontic appliance, whereby the orthodontic appliance is particularly preferred an orthodontic bracket or an orthodontic aligner.

Embodiment 29

Use of the arrangement according to the embodiment 25 for manufacturing an orthodontic appliance, whereby the orthodontic appliance is particularly preferred an orthodontic bracket or an orthodontic aligner.

BRIEF DESCRIPTION OF THE DRAWINGS

Further details and advantages of the present invention are explained in more detail below with reference to the description of the figures and with reference to the exemplary embodiments illustrated in the drawings. In the drawings, the figures show.

DETAILED DESCRIPTION OF THE EMBODIMENTS

Figure 1A:
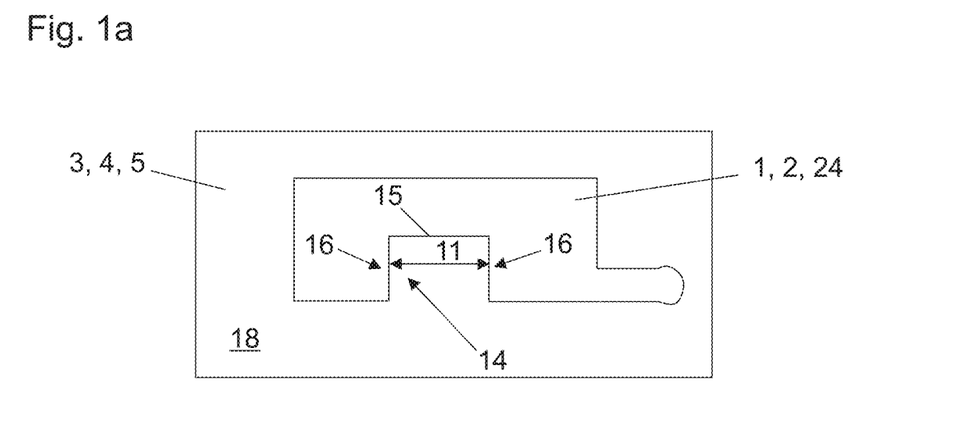
FIG. 1a-1b a 3D-printing device pursuant to a preferred embodiment in a schematically illustrated view from the top and from the side to perform a particularly preferred method for manufacturing an object, FIG. 2 a 3D-printed object in the form of an orthodontic appliance fabricated by the 3D-printing device according to FIG. 1b in a perspective view, FIG. 3 a detail section of an object to be printed, whereby different intensity levels are used, FIG. 4 different virtual models of an object to be printed contrasted with an orientation of illumination pixels of means for illumination, FIG. 5a-5b a schematical illustration of various intensity levels with respect to different illumination pixels and distinct layers to be zonally solidified.

FIG. 1a discloses a 3D-printing device 3 in the form a lithography-based ceramic manufacturing apparatus 23 and the material used by the 3D-printing device 3 to fabricate the object 1 is in the form of ceramic. In general, different 3D-printing devices as for example a slurry-based additive manufacturing apparatus, in particular with plastic as printing material, or SLM/SLS, in particular with metal as printing material, can be used as well to improve a precision and a smoothness of a dimension 11 or rather feature of an object 1 to be printed.

The 3D-printing device 3 comprises a print platform 18, whereby the geometry of the print platform 18 is in general arbitrary. It is feasible to use a disc-shaped print platform 18, whereby a mixing device rotates in a plane of the disc-shaped print platform 18 to mix the material used to build the object 1 to be printed.

Figure 1B:
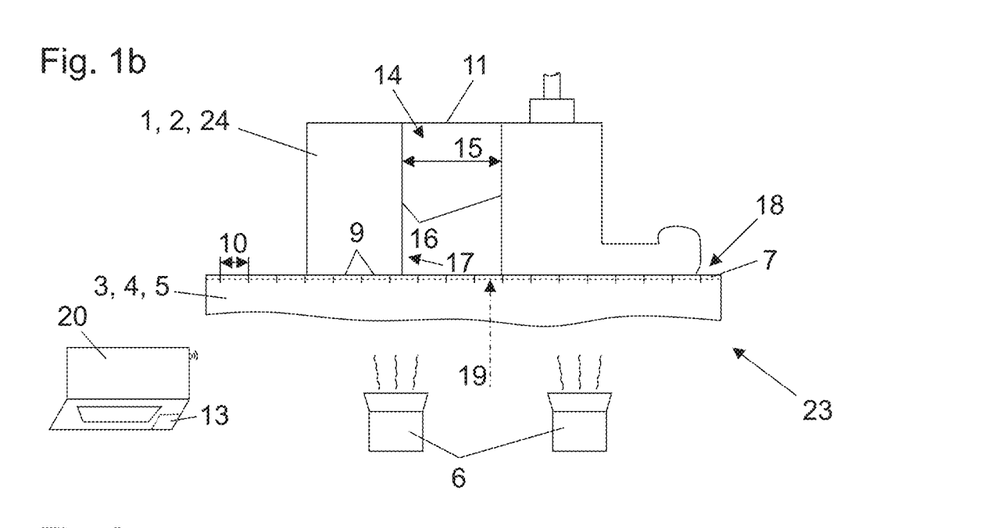

FIG. 1b discloses the 3D-printing device 3 from a different angle of perspective, whereby two means for illumination 6 are used to solidify non-solidified material 5 in the printing process. The number of means for illumination 6 is in general arbitrary, whereby exactly one means for illumination 6 can be used as well. The means for illumination 6 are positioned relative to the print platform 18 in an illumination direction 19 in a direction orthogonal to the print platform 18.

By use of the 3D-printing device a method for manufacturing the object 1 in the form of an orthodontic appliance 2 can be processed. The 3D-printing device 3 comprises a supply device 4 for provision of a non-solidified material 5 which is in this embodiment a liquid suspension of ceramic powder and UV-light sensitive monomers. The means for illumination 6 solidify a layer 7 of non-solidified material 5 provided by the supply device 4 zonally to fabricate the object 1.

An intensity and a duration of the means for illumination 6 are adjustable, whereby a virtual model 8 of the object 1 to be printed is provided for the 3D-printing device 3. The virtual model 8 is chosen to be arranged along the print platform 18 such that scattered light of the means for illumination 6 reflected by the object 1 is reduced with respect to a dimension 11 of the object 1. Traverse arriving light by the means for illumination 6 could lead to undesired solidification in a layer 7 of non-solidified material 5 provided by the supply device 4 such that end faces of solidified regions of the layer 7 are not orthogonal to deck areas of the layer 7. However, scattered light—in particular inside the layer 7—can be used to manipulate the region of the layer 7 which is solidified and thus adjust the solidification of non-solidified material 5 to meet a chosen dimension 11 of the object to be printed even below a resolution defined by illumination pixels 9.

In connection with an accurate alignment of the dimension 11—which can be a feature of the object 1 in one, two or three dimension—with respect to illumination pixels 9 and digital pixels 21 of the virtual model 8 the dimension 11 of the object 1 can be produced very precise and with very smooth transitions to subsequent layers 7 to be solidified and adjacent features of the object 1 to be printed.

The means for illumination 6 solidify the layer 7 at least zonally, whereby the intensity or the duration of the means for illumination 6 are adjusted with respect to a chosen precision of the dimension 11 of the object 1.

The object 1 is in the form of an orthodontic appliance 2, whereby the method is used for manufacturing orthodontic brackets 24. The orthodontic appliance 2 comprises an arch wire slot 14 with a width 15 of the arch wire slot 14 and the dimension 11 of the object 1 is the width 15 of the arch wire slot 14. Apparently, other dimensions 11 of the object like faces 16 of the arch wire slot 14, a complete surface 17 of the arch wire slot 14 or external dimensions of various features of the object 1 can be used as well.

The intensity or the duration of the means for illumination 6 is adjusted with respect to an expansion and a reduction of a region in which material is solidified to meet the chosen precision of the selected dimension 11 of the object 1.

An arrangement of a processing unit 13 of a computer 20 and a 3D-printing device 3 for manufacturing the object 1 comprising the supply device 4 for providing the non-solidified material 5 and means for illumination 6 to solidify a layer 7 of non-solidified material 5 provided by the supply device 4 at least zonally to fabricate the object 1 is disclosed, whereby the arrangement is suitable to perform the method for manufacturing the orthodontic appliance 2.

The computer 20 is in signal conducting connection with the 3D-printing device 3. The connection to transfer information or digital data records can be in general provided wireless or by a wire connection. A digital data record comprising instructions for the 3D-printing device 3 to fabricate the object 1 is transmitted by the processing unit 13 to the 3D-printing device 3. The computer 20 uses a computer program—stored on a non-volatile storage medium, for example in the form of an algorithm—which, when the program is executed by the processing unit 13, causes the processing unit 13 to carry out the method for manufacturing the object 1. A computer-readable medium comprising instructions which, when executed by the processing unit 13, cause the arrangement to carry out the method, for example after transmitting digital data records to the 3D-printing device 3 or (if applicable, generated and) processed by the 3D-printing device 3 on its own. In general, the computer 20 can be an integral part of the 3D-printing device 3.

On the top of the object 1, a movement device is shown to repetitively move the object 1 relative to the print platform 18 for each layer 7 to be zonally solidified.

Figure 2:
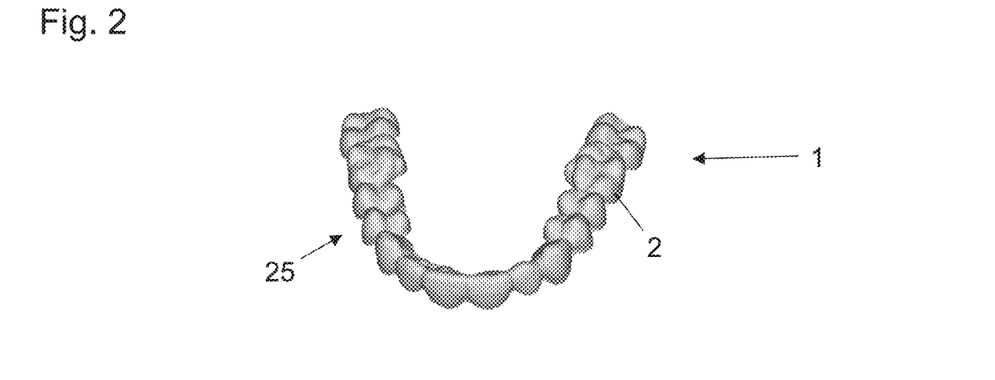

FIG. 2 discloses an orthodontic appliance 2 in the form of an orthodontic aligner 25 as the object 1 that is printed by the 3D-printing device 3 and the use of the arrangement pursuant to FIG. 1b.

Figure 3:
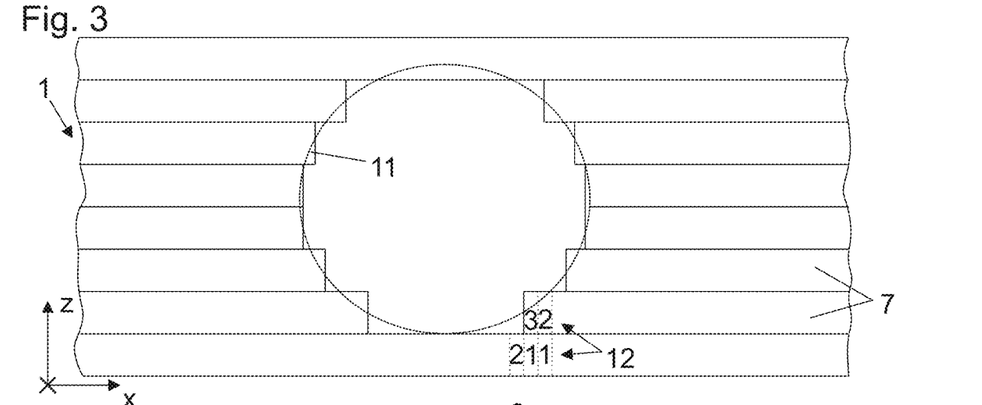

FIG. 3 disclose a feature of the object 1 in the form of an opening, whereby a shell surface of the opening is used as the dimension 11 of interest for the object 1 to be printed. The illumination pixels 9 of each layer 7 can be illuminated by the means for illumination 6 with 256 equidistant different intensity levels 12, whereby the intensity level 12 of a specific illumination pixel 9 is adjustable. The number 256 of intensity levels 12 and the distance of two intensity levels 12, viz. the difference of intensity of light of the individual intensity levels 12, is in general arbitrary and can be chosen with respect to the specific requirements for the 3D-printing device 3. By use of the intensity levels 12, an improved approximation of the shell surface of the opening by the layered structure of the object in three dimensions is enabled. The intensity levels 12 can be used merely for a one-dimensional or two-dimensional structure of the object 1 to be printed as well.

The provision of the layer 7 of non-solidified material 5 and the at least zonally solidification of the layer 7 are repeatedly processed by the 3D-printing device 3 to iteratively fabricate the object 1.

Figure 4:
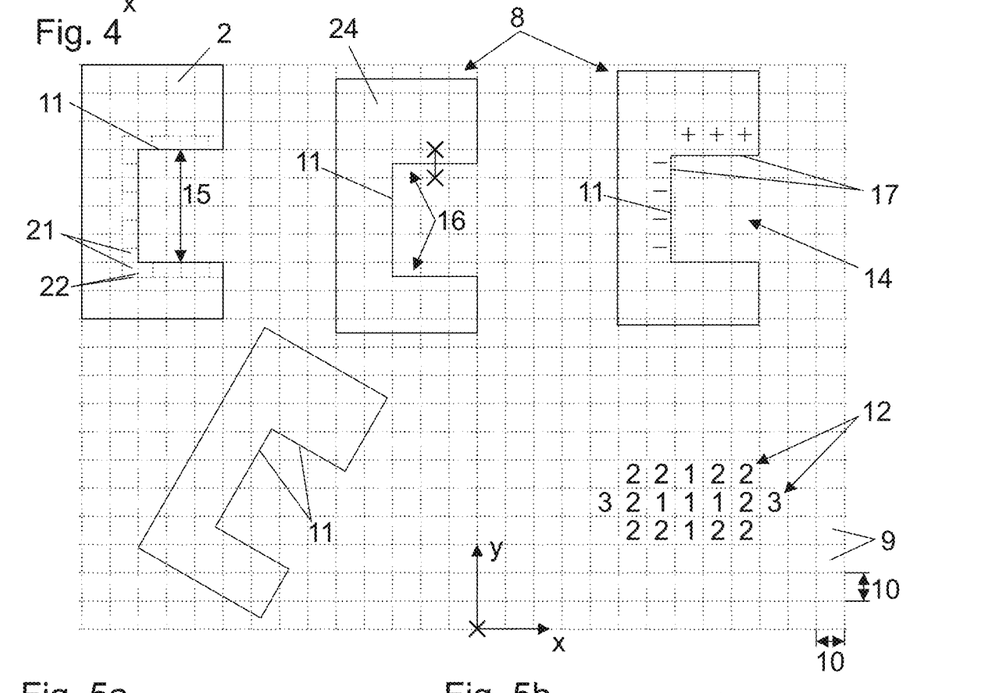

FIG. 4 discloses a preparation for the manufacturing process before the means for illumination 6 solidify the layer 7 at least zonally. A virtual model 8 of the object 1 to be printed is provided for the 3D-printing device 3, whereby the virtual model 8 comprises digital pixels 21 with a dimension 22 of 20 μm, whereby dimensions 22 of the digital pixels 21 can be used according to the specific demands of the fabrication process. The dimension 22 of the digital pixel 21 (or the dimension 10 of the illumination pixel 9) of interest can be defined as a length extension of the digital pixel 21 in one dimension. An approach in two dimensions can be done analogously.

The means for illumination 6 comprise illumination pixels 9 arranged in a grid, for example, with a dimension 10 of 40 μm (that can be adjusted to a desired precision under consideration of boundary conditions like manufacturing time).

In the left upper corner, the virtual model 8 of the object 1 (disclosed as a sectional view of the object 1 along the print platform 18) is prepared ideally, whereby the dimension 11 of the object 1 is chosen to be aligned with the dimension 22 of the digital pixels 21. The dimension 11 of the object 1 represented by the virtual model 8 is chosen to be aligned with the dimension 10 of the illumination pixels 9. Hence, the dimension 11 of the object 1 is fabricated in an optimal way.

The virtual model 8 of the object 1 which is centered in the view on the upper side is shifted by a half dimension 10 of the illumination pixel 9, wherein an ambiguity with respect of the dimension 11 of the object 1 to be printed is present. In the right upper corner, the dimension 11 of the object 1 represented by the virtual model 8 of the object 1 is aligned with the dimension 10 of the illumination pixels 9 on one side but does not math the dimension 10 of the illumination pixels 9 on the other side, so that the arch wire slot 14 will be fabricated (with a threshold-value of 50%) too large. This can be overcome by adjusting the intensity or the duration of the illumination for specific illumination pixels 9 (indicated by "+" or rather "−") accordingly such that a region in which material is solidified is expanded or rather reduced. The result is the dimension 11 of the object 1 as desired.

In the left bottom corner, the virtual model 8 is tilted in addition. As no extended alignment with the dimension 11 of the object 1 is present, the quality of the object 1 will be below the quality of the object 1 in the left upper corner. In the right bottom corner, it is illustrated that an individual layer 7 can be provided with a two-dimensional array of intensity levels 12, whereby this two-dimensional array can be adjusted for each layer 7 during the fabrication process of the object 1.

A shrinkage of the object 1 during illumination and post-processing is already considered in the provision of the virtual models 8.

By the processing unit 13 of the computer 20 (cf. FIG. 1b) the virtual model 8 is created automatically, the dimension 11 of the object 1 is identified automatically, digital pixels 21 of the virtual model 8 are aligned with the dimension 11 of the object 1 automatically, the illumination pixels 9 to be arranged at the layer 7 for zonally solidification are aligned with the dimension 11 of the object 1 automatically and a digital data record is created automatically. Obviously, the automatization of the process by the processing unit 13 (if applicable as part of the 3D-printing device as such) can be done partially, whereby certain process steps are done manually by an operator of the computer 20 or the 3D-printing device.

The digital data record comprises intensity instructions and duration instructions for the means for illumination 6 and can further include complementary information about the object 1 to be printed such as a material composition for instance. The intensity and duration is chosen by the computer 20 automatically under consideration of a chosen precision of the dimension 11 of the object 1 (for example, chosen by a template or an operator of the arrangement). For this embodiment, the chosen precision is 20 μm which is more accurate than usually possible by the illumination pixel grid enabling a precision of 40 μm.

The intensity and duration vary for different digital pixels 21 of the virtual model 8 and different illumination pixels 9 of the means for illumination 6 arranged at the layer 7 to be zonally solidified. Moreover, the intensity and duration vary for different dimensions 11 of the object 1 (width 15 of the arch wire slot 14 and depth of the arch wire slot 14) and one chosen dimension 11 of the object 1 (complete surface 17 of the arch wire slot 14 of the orthodontic bracket 24) and one non-chosen dimension of the object 1 (base of the orthodontic bracket 24).

Figure 5A:
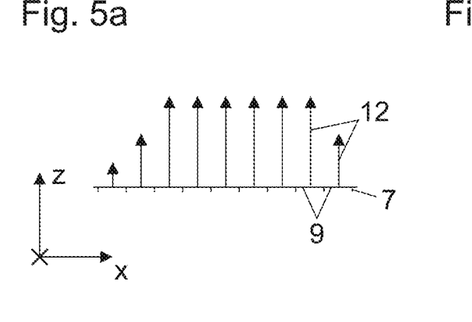
Figure 5B:
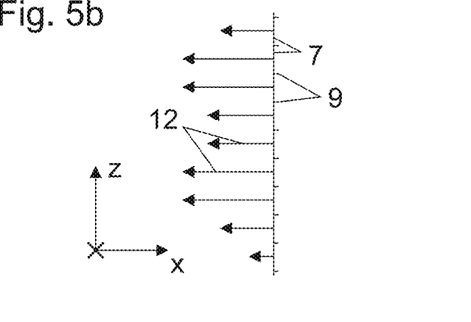

FIG. 5a and FIG. 5b illustrate that the intensity levels 12 for illumination pixels 9 in a specific layer 7 (in an x-y-reference plane) and for distinct layers 7—in printing direction z—can be adjusted flexibly and individually.

What is claimed is:

1. A method for manufacturing an orthodontic appliance with a 3D-printing device, the method comprising the steps of:
providing a 3D-printing device comprising a supply device and a means for illumination,
providing a virtual model of the orthodontic appliance comprising a digital data record created by a processing unit of a computer for the 3D-printing device to manufacture the orthodontic appliance, wherein the digital data record comprises intensity instructions and duration instructions for the means for illumination,
providing a layer of non-solidified material with the supply device,
solidifying the layer of non-solidified material at least zonally with the means for illumination, and
automatically adjusting at least one of an intensity and a duration of light emitted by the means for illumination for solidifying the non-solidified material with respect to a chosen precision of at least one dimension of the orthodontic appliance as an input parameter for the automatic adjustment, the automatic adjustment based on a corresponding one or both of the intensity instructions and the duration instructions of the digital data record.

2. The method according to claim 1, whereby the chosen precision is between 10 μm and 35 μm.

3. The method according to claim 1, whereby at least one of the intensity and the duration is automatically adjusted so as to vary for at least one of:
different digital pixels of the virtual model,
different illumination pixels of the means for illumination arranged at the layer to be at least zonally solidified,
different dimensions of the orthodontic appliance, and
the at least one dimension corresponding to the chosen precision and at least one other dimension of the orthodontic appliance.

4. The method according to claim 1, further comprising the step of adjustably illuminating specific illumination pixels of the means for illumination arranged at the layer to be at least zonally solidified to different intensity levels.

5. The method according to claim 1, whereby the steps of providing a layer of non-solidified material with the supply device and solidifying the layer of non-solidified material at least zonally with the means for illumination are repeated to iteratively fabricate the orthodontic appliance.

6. The method according to claim 1, whereby the orthodontic appliance comprises an arch wire slot.

7. The method according to claim 1, wherein the orthodontic appliance comprises an orthodontic bracket or an orthodontic aligner.

8. The method according to claim 6, whereby the arch wire slot has a width and the at least one dimension of the orthodontic appliance corresponds to at least one of the width of the arch wire slot and at least one face of the arch wire slot.

9. The method according to claim 1, whereby the 3D-printing device comprises a print platform, and further comprising the steps of: positioning the means for illumination relative to the print platform such that light emitted by the means for illumination is directed in a direction orthogonal to the print platform.

10. The method according to claim 1, further comprising at least one step of the processing unit of the computer for automatically:
identifying the at least one dimension of the orthodontic appliance,
aligning digital pixels of the virtual model with the at least one dimension of the orthodontic appliance and/or
aligning illumination pixels of the means for illumination arranged at the layer to be at least zonally solidified with the at least one dimension of the orthodontic appliance.

11. The method according to claim 1, whereby the 3D-printing device is in the form of a slurry-based additive manufacturing apparatus or a lithography-based ceramic manufacturing apparatus and whereby the non-solidified material comprises a material selected from the group consisting of a ceramic, a plastic and a metal.

12. The method according to claim 1, wherein the virtual model takes into account a predicted shrinkage of the orthodontic appliance during at least one of the step of solidifying the layer of non-solidified material and a post-processing step.

13. The method according to claim 1, whereby the means for illumination comprises illumination pixels arranged in a grid with a dimension between 10 μm and 80 μm, the at least one dimension of the orthodontic appliance being aligned with the dimension of the illumination pixels.

14. The method according to claim 1, whereby the virtual model comprises digital pixels with a dimension between 10 μm and 80 μm, the at least one dimension of the orthodontic appliance being aligned with the dimension of the digital pixels.

15. The method according to claim 1, whereby different illumination pixels of the means for illumination can be illuminated by the means for illumination with 256 equidistant, different and adjustable intensity levels.

16. A computer program stored on non-volatile storage medium which, when executed by a processing unit, causes the processing unit to carry out the method of claim 1.

17. A computer-readable medium comprising instructions to carry out the method of claim 1 when executed by a processing unit.

* * * * *